United States Patent
Ghosh

(10) Patent No.: US 9,473,284 B2
(45) Date of Patent: Oct. 18, 2016

(54) CONTENTION FOR CHANNEL ACCESS IN WIRELESS NETWORK

(71) Applicant: Nokia Corporation, Espoo (FI)

(72) Inventor: Chittabrata Ghosh, Fremont, CA (US)

(73) Assignee: Nokia Corporation, Espoo (FI)

( * ) Notice: Subject to any disclaimer, the term of this patent is extended or adjusted under 35 U.S.C. 154(b) by 151 days.

(21) Appl. No.: 14/330,152

(22) Filed: Jul. 14, 2014

(65) Prior Publication Data

US 2016/0014807 A1    Jan. 14, 2016

(51) Int. Cl.
*H04W 74/00* (2009.01)
*H04L 5/00* (2006.01)
*H04W 74/08* (2009.01)

(52) U.S. Cl.
CPC ........... *H04L 5/0058* (2013.01); *H04L 5/0048* (2013.01); *H04W 74/008* (2013.01); *H04W 74/0808* (2013.01)

(58) Field of Classification Search
CPC ............. H04L 12/413; H04L 12/4013; H04L 1/0025; H04L 12/40136; H04W 56/00; H04W 72/1242; H04W 72/1231; H04W 72/1226; H04W 74/0841; H04W 74/085
See application file for complete search history.

(56) References Cited

U.S. PATENT DOCUMENTS

| | | | | |
|---|---|---|---|---|
| 6,157,616 A | * | 12/2000 | Whitehead ............... | H04L 47/10 370/252 |
| 2007/0242621 A1 | * | 10/2007 | Nandagopalan ...... | H04L 12/413 370/254 |
| 2011/0205961 A1 | * | 8/2011 | Santivanez ....... | H04W 74/0816 370/328 |
| 2013/0223303 A1 | * | 8/2013 | Nakakuki .............. | G08G 1/094 370/310 |
| 2014/0010081 A1 | * | 1/2014 | Benveniste ............. | H04L 47/10 370/230 |
| 2015/0071215 A1 | * | 3/2015 | Tian ...................... | H04W 24/08 370/329 |

FOREIGN PATENT DOCUMENTS

JP        EP 2217030 B1 *  8/2011  ........ H04W 74/0808

* cited by examiner

*Primary Examiner* — Dang Ton
*Assistant Examiner* — Sai Aung
(74) *Attorney, Agent, or Firm* — Banner & Witcoff, Ltd.

(57) ABSTRACT

A method, apparatus, and computer program for configuring channel sensing parameters of an apparatus are disclosed in this document. The method comprises providing a mapping between reception sensitivity thresholds for determining whether a radio channel is busy or available for channel access and time values affecting a back-off time representing a time interval the apparatus refrains from channel access upon determining that the radio channel is busy, wherein a first time value is mapped to a first reception sensitivity threshold and a second time value is mapped to a second reception sensitivity threshold such that when the first reception sensitivity threshold provides a higher probability for the apparatus to determine that the channel is busy than the second reception sensitivity threshold, the first time value provides the apparatus with a lower back-off time than the second time value; and selecting a combination of a reception sensitivity threshold and a time value mapped to each other.

22 Claims, 4 Drawing Sheets

CONTENTION FOR CHANNEL ACCESS IN WIRELESS NETWORK

FIELD

The invention relates to the field of wireless networks and, particularly, to channel access comprising contention.

BACKGROUND

In some wireless networks, a plurality of wireless devices may attempt to access a transmission medium at the same time. The channel access may comprise sensing the channel for pending transmissions. If the transmission medium is sensed to be busy, a wireless device may back off and attempt the channel access after the channel is sensed to be available.

BRIEF DESCRIPTION

According to an aspect of the present invention, there is provided a method comprising: providing, in an apparatus, mapping between reception sensitivity thresholds for determining whether a radio channel is busy or available for channel access and time values affecting a back-off time representing a time interval the apparatus refrains from channel access upon determining that the radio channel is busy, wherein a first time value is mapped to a first reception sensitivity threshold and a second time value is mapped to a second reception sensitivity threshold such that when the first reception sensitivity threshold provides a higher probability for the apparatus to determine that the channel is busy than the second reception sensitivity threshold, the first time value provides the apparatus with a lower back-off time than the second time value; and selecting, by the apparatus, a combination of a reception sensitivity threshold and a time value mapped to each other.

According to another aspect, an apparatus comprising means for carrying out the above-described method may be provided.

According to another aspect of the present invention, there is provided an apparatus comprising at least one processor and at least one memory including a computer program code. The at least one memory and the computer program code are configured, with the at least one processor, to cause the apparatus to: provide a mapping between reception sensitivity thresholds for determining whether a radio channel is busy or available for channel access and time values affecting a back-off time representing a time interval the apparatus refrains from channel access upon determining that the radio channel is busy, wherein a first time value is mapped to a first reception sensitivity threshold and a second time value is mapped to a second reception sensitivity threshold such that when the first reception sensitivity threshold provides a higher probability for the apparatus to determine that the channel is busy than the second reception sensitivity threshold, the first time value provides the apparatus with a lower back-off time than the second time value; and select a combination of a reception sensitivity threshold and a time value mapped to each other.

According to yet another aspect of the present invention, there is provided a computer program product embodied on a distribution medium readable by a computer and comprising program instructions which, when loaded into an apparatus, execute a computer process comprising: providing mapping between reception sensitivity thresholds for determining whether a radio channel is busy or available for channel access and time values affecting a back-off time representing a time interval the apparatus refrains from channel access upon determining that the radio channel is busy, wherein a first time value is mapped to a first reception sensitivity threshold and a second time value is mapped to a second reception sensitivity threshold such that when the first reception sensitivity threshold provides a higher probability for the apparatus to determine that the channel is busy than the second reception sensitivity threshold, the first time value provides the apparatus with a lower back-off time than the second time value; and selecting a combination of a reception sensitivity threshold and a time value mapped to each other.

Embodiments of the invention are defined in the dependent claims.

LIST OF DRAWINGS

Embodiments of the present invention are described below, by way of example only, with reference to the accompanying drawings, in which FIG. 1 illustrates a wireless communication scenario to which embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
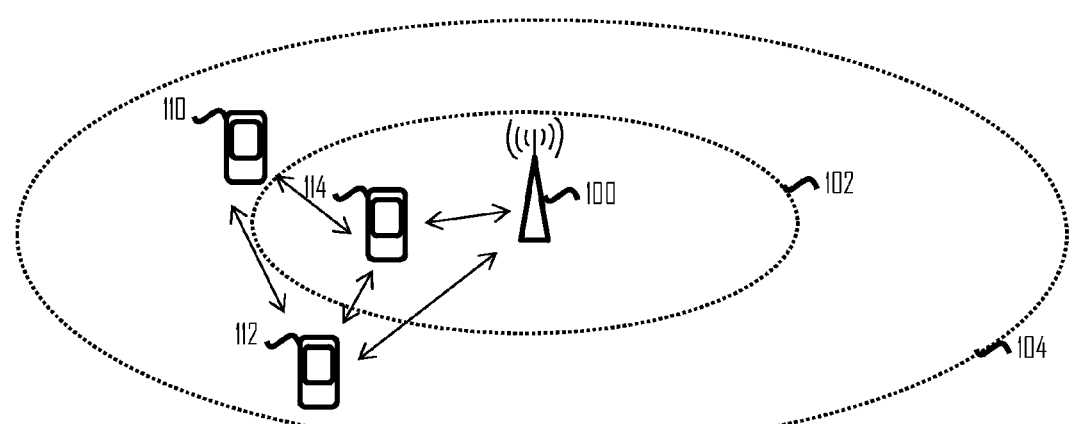

A general wireless communication scenario to which embodiments of the invention may be applied is illustrated in FIG. 1. FIG. 1 illustrates wireless communication devices comprising an access point (AP) 100 and a plurality of terminal devices (STA) 110, 112, 114, 116. The AP 100 may be a stationary access point or a mobile access point. A general term used in this specification and encompassing both the APs and STAs is a wireless device. The access point may refer to an access point specified in IEEE 802.11 specifications or to a base station of another wireless access network. The mobile access point may have a functionality of a STA as well. A common term encompassing both the stationary APs and mobile APs is an access node. An access node may provide or be comprised in a basic service set (BSS) which is a basic building block of an IEEE 802.11 wireless local area network (WLAN). Each access node may represent a different BSS. A single access node may, however, establish a plurality of BSSs. The most common BSS type is an infrastructure BSS that includes a single access node together with all STAs associated with the access node. The access node may provide access to other networks, e.g. the Internet. In another embodiment, the BSSs may be connected with each other by a distribution system (DS) to form an extended service set (ESS). An independent BSS (IBSS) is formed by an ad hoc network of terminal devices without a stationary controlling AP. In a context where two BSSs have overlapping coverage areas, one BSS may be considered as an overlapping BSS (OBSS) from the viewpoint of the other BSS. While embodiments of the invention are described in the context of the above-described topologies of IEEE 802.11, it should be appreciated that these or other embodiments of the invention may be applicable to wireless networks based on other specifications, e.g. WiMAX (Worldwide Interoperability for Microwave Access), UMTS LTE (Long-term Evolution for Universal Mobile Telecommunication System), mobile ad hoc networks (MANET), mesh networks, and other networks having cognitive radio features, e.g. transmission medium sensing features and adaptive capability to coexist with radio access networks based on different specifications and/or standards. Some embodiments may be applicable to networks having features under development by other IEEE task groups. Therefore, the following description may be generalized to other systems as well.

The different access nodes may operate at least partly on different channels, e.g. on different frequency channels. IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac task group extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands. Different BSSs may employ different primary channels.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Some networks may employ enhanced distributed channel access (EDCA) which provides quality-of-service (QoS) enhancements to medium access control (MAC) layer. The QoS enhancements may be realized by providing a plurality of access categories (AC) for prioritizing frame transmissions. The access categories may comprise the following priority levels in the order of increasing priority: background (AC_BK), best effort (AC_BE), video streaming (AC_VI), and voice (AC_VO). A higher priority frame transmission may use a shorter contention window and a shorter arbitration inter-frame spacing (AIFS) that result in higher probability of gaining the TXOP. Furthermore, some networks may employ restricted access windows (RAW) where a reduced set of wireless devices of the wireless network may carry out channel contention. The access node may define the RAW and a group of wireless devices that are allowed to attempt the channel access within the RAW. Grouping allows partitioning of the wireless devices into groups and restricting channel access only to wireless devices belonging to a specified group at any given time period. The time period may be enabled by allocating slot duration and a number of slots in RAW access. The grouping may help to reduce contention by restricting access to the medium only to a subset of the wireless devices. The grouping may also reduce the signalling overhead.

As described above, the BSS may be represented by the access node and one or more terminal devices connected to the access node. In the example of FIG. 1, the access node 100 and the terminal devices 112, 114 may be comprised in a first BSS, while the terminal device 110 may be comprised in a second BSS which is a neighbour to the first BSS and an OBSS with respect to the first BSS. This is a common situation in dense deployment scenarios where multiple overlapping wireless networks have been installed. The first BSS and the second BSS may be overlapping BSSs in the sense that at least some of the devices first BSS are capable of receiving frames from the second BSS and vice versa.

A terminal device may establish a connection with any one of the access nodes it has detected to provide a wireless connection within the neighborhood of the terminal device. In the example of FIG. 1, let us assume a situation where the terminal devices 112, 114 located within a coverage area 104 of the access node 100 establish a connection to that access node 100. While the terminal device 110 is within the coverage area 104, let us assume that it has connected to another access node (not shown). The connection establishment may include authentication in which an identity of the terminal device is established in the access node. The authentication may comprise exchanging an encryption key used in the BSS. After the authentication, the access node and the terminal device may carry out association in which the terminal device is fully registered in the BSS, e.g. by providing the terminal device with an association identifier (AID). It should be noted that in other systems terms authentication and association are not necessarily used and, therefore, the association of the terminal device to an access node should be understood broadly as establishing a connection between the terminal device and the access node such that the terminal device is in a connected state with respect to the access node and scanning for downlink frame transmissions from the access node and its own buffers for uplink frame transmissions.

In a conventional 802.11 network, a wireless device initiating a TXOP may transmit a frame that triggers a network allocation vector (NAV). The frame may be a management frame such as a request-to-send (RTS) frame or a data frame. The frame may comprise a Duration field defining the duration of the NAV. Any other wireless device detecting the frame and extracting the Duration field suspends access to the same channel for the duration of the NAV. This mechanism may reduce collisions. The 802.11 networks may employ another collision avoidance mechanism called clear-channel assessment (CCA). A wireless device trying to access the channel scans for the channel before the access. If the channel is sensed to contain radio energy that exceeds a CCA threshold, the wireless device refrains from accessing the channel. If the channel is sensed to be free and no NAV is currently valid, the wireless device may access the channel. A conventional value for the CCA threshold may be −72 decibel-milliwatts (dBm).

The wireless devices 110, 112, 114 may employ a randomized back-off time defining a minimum time interval they refrain from frame transmissions. During the channel sensing, the back-off time may be decremented while the channel is sensed to be idle or available for the channel access. When the back-off time reduces to zero and the channel is still sensed to be idle, the wireless device may carry out the frame transmission. The back-off time value may be maintained for the duration the channel is sensed to be busy and, in some systems, for a determined guard time interval (e.g. the AIFS) after the detection that the channel has become idle.

The wireless devices, e.g. the terminal devices 112, 114 may employ different CCA thresholds. For example, a terminal device 114 located close to the access node 114 may employ a higher CCA threshold while a terminal device 112 located further away from the access node 100 may employ a lower CCA threshold. The different CCA threshold zones are illustrated in FIG. 1 as areas separated by a boundary 102 provided within the coverage area 104. The number of zones and associated different CCA threshold values may be higher than two. The limits and the shape of the boundary may be determined, for example, by a specific value of a received signal strength indicator (RSSI) measured from a signal received from the access node. An example of such a signal is a beacon frame or a probe response frame. In this manner, the different locations around the access node where this specific value is measured draw the boundaries of the CCA threshold zone. According to another viewpoint, the limits of a CCA threshold zone may be defined jointly from measured CCA values that are within a determined range and from a location of the measuring terminal device with respect to the access node, wherein the shape of the CCA threshold zone boundary is derived from the location of the terminal device that measures the CCA values that are within the determined range. The effect of the different CCA thresholds is that the terminal device 114 closer to the access node 100 has a lower sensitivity to overlapping transmissions than the terminal device 112 further away from the access node 100. It means that upon detecting an overlapping transmission having a given RSSI in the CCA procedure, the wireless device 114 has a higher probability of gaining channel access than the wireless device 112. This results in that statistically the terminal device 114 gains more transmission opportunities than the terminal device 112. Such a scheme may be unfair from the viewpoint of the terminal device 112.

A general principle of employing the different CCA thresholds in the terminal devices 112, 114 may be to provide a mapping between the measured RSSI values and the CCA threshold values. The number of mapped pairs of RSSI values and the CCA threshold values and, thus, the number of different CCA threshold value options may depend on the implementation.

Figure 2:
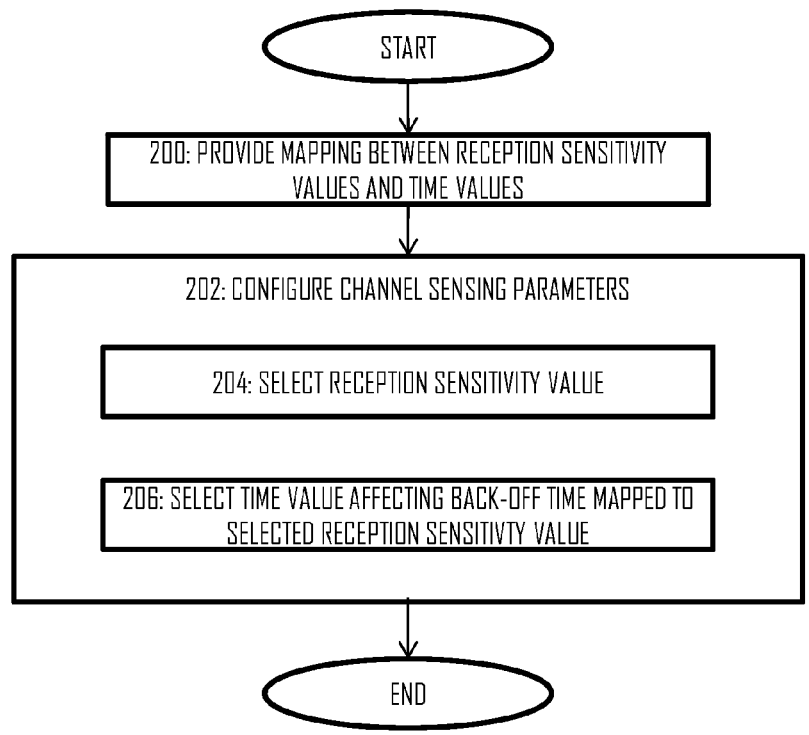
FIG. 2 illustrates a flow diagram of a process for configuring channel sensing parameters in an apparatus according to an embodiment of the invention.

FIG. 2 illustrates a flow diagram of an embodiment of a method for configuring channel sensing parameters for the CCA or a similar procedure, for example. The method may be carried out in an apparatus, e.g. a wireless device 100 to 114 or a terminal device 110 to 114. Referring to FIG. 2, the method comprises providing mapping between reception sensitivity thresholds representing thresholds for determining whether a radio channel is busy or available for channel access and time values affecting a back-off time representing a time interval the apparatus refrains from channel access upon determining that the radio channel is busy. The mapping is provided in block 200 and a first time value is mapped to a first reception sensitivity threshold and a second time value is mapped to a second reception sensitivity threshold such that when the first reception sensitivity threshold provides a higher probability for the apparatus to determine that the channel is busy than the second reception sensitivity threshold, the first time value provides the apparatus with a lower back-off time than the second time value. The mapping may be understood such that once an apparatus selects one of the reception sensitivity threshold and the time value, the apparatus is bound to select the other parameter(s) mapped to the selected parameter. In block 202, channel sensing parameters are configured in the apparatus, and block 202 may comprise selecting a combination of a reception sensitivity threshold and a time value mapped to each other. In block 204, the reception sensitivity threshold is selected and the time value is selected in block 206. The order of executing blocks 204, 206 may be arbitrary because of the mapping provided in block 200.

The embodiment of FIG. 2 provides an effect that when the apparatus uses the reception sensitivity threshold leading to channel access with a higher probability, the apparatus will back off for a longer duration when determining the channel to be busy. On the other hand, when the apparatus uses the reception sensitivity threshold leading to channel access with a lower probability, the apparatus will back of for a shorter duration when determining the channel to be busy. A result is that the apparatus backing off with the higher probability may reattempt the channel access more frequently. This improves the fairness in the channel access compared with the situation described above.

Figure 3:
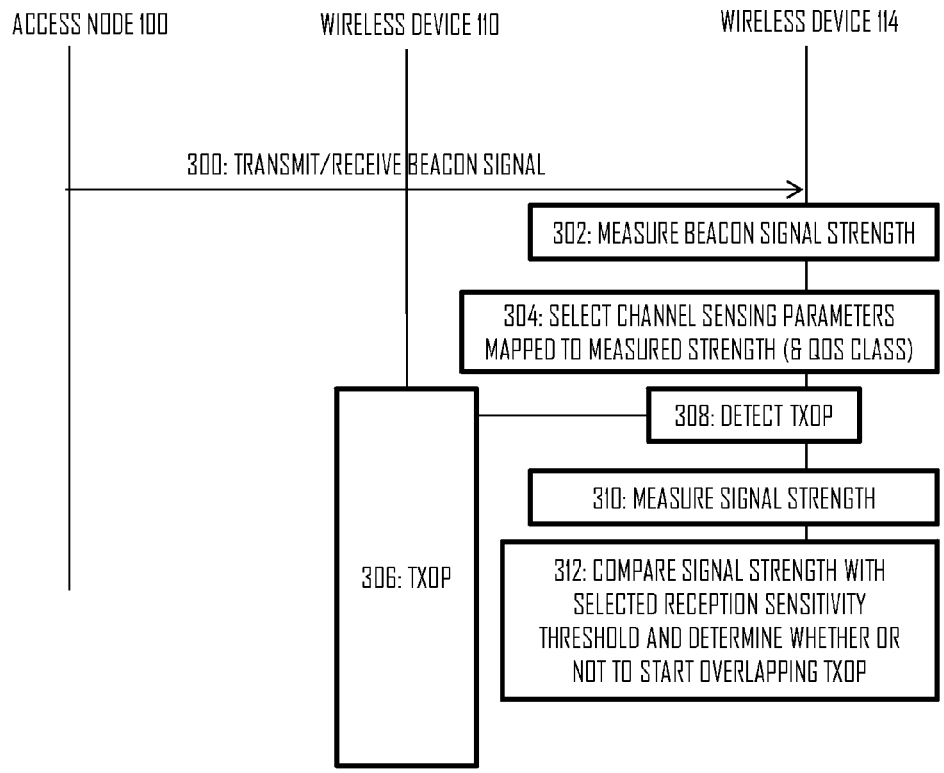
FIG. 3 illustrates a signalling diagram of configuring the channel sensing parameters and using the channel sensing parameters in channel access according to an embodiment of the invention.

With respect to the mapping, the mapping may be considered as an obligation to select the channel sensing parameters that have been mapped to each other. For example, use of a reception sensitivity threshold and a time value that have not been mapped to each other may be prohibited. The reception sensitivity thresholds and the time values may be directly mapped to each other in a mapping table or in a mapping database, or the mapping between the reception sensitivity thresholds and the time values may be realized indirectly through an intermediate parameter to which both a reception sensitivity threshold and a time value has been mapped. Such an intermediate parameter may be a reception signal strength value of a received beacon signal. FIG. 3 illustrates such an embodiment.

In an embodiment, the one of the time value and the reception sensitivity threshold is a function of the other of the time value and the reception sensitivity threshold. Selecting one of these values may lead to selecting the other of these values. A determined range of the reception sensitivity threshold values may lead to selecting the same time value or, vice versa, a determine range of time values may lead to selecting the same reception sensitivity threshold. In another embodiment, there may be different time values for each reception sensitivity threshold value.

In an embodiment, a first reception sensitivity threshold is linked to a first signal strength range of the received beacon signal and the second reception sensitivity threshold is linked to a second signal strength range of the received beacon signal such that when the first signal strength range is below the second signal strength range, the first reception sensitivity threshold provides the higher probability for the apparatus to determine that the channel is busy than the second reception sensitivity threshold. Referring to FIG. 1, the circle enclosed by the boundary 102 may define the second signal strength range of the beacon signal received from the access node, and the area between boundaries 102, 104 may define the first signal strength range. In practice, the wireless device 114 within the first signal strength range has a higher tolerance for overlapping transmissions than the wireless device 112 in the second signal strength range.

Referring to FIG. 3, let us consider the scenario illustrated in FIG. 3. The access node 100 may be configured to transmit a beacon signal periodically (step 300). Upon receiving the beacon signal in step 300, the wireless device 114 may in block 302 measure a reception signal strength value representing signal strength of the received beacon signal. The reception signal strength value may be used as a measure of the distance between the access node 100 and the wireless device 114. In block 304, the wireless device selects the channel sensing parameters mapped to the measured reception signal strength value. Block 304 may comprise the selection of the reception sensitivity threshold (block 204) and the selection of the time value (block 206) on the basis of the reception signal strength value. As an additional or alternative criterion for the selection in block 304, the wireless device 114 may use a current quality-of-service (QoS) class, e.g. one of the AC_BK, AC_BE, AC_VI, and AC-VO.

Upon selecting the channel sensing parameters, the wireless device 114 may start the channel sensing in an attempt to gain access to the channel and to gain a TXOP. The channel sensing may comprise the above-described CCA procedure in which case the reception sensitivity threshold may be the CCA threshold. In an embodiment, a CCA threshold providing the higher probability for the channel access may be the above-mentioned −72 dBm while a CCA threshold providing the lower probability for the channel access may be −82 dBm or −92 dBm causing the wireless device to detect signals received with very low reception signal strength. Let us assume that the wireless device 110 gains channel access in block 306 and initiates the TXOP by transmitting a frame. The wireless device 114 detects the frame during the channel sensing procedure in block 308 and measures a signal strength value of the detected frame in block 310. The measured signal strength value is then compared in block 312 with the reception sensitivity threshold selected in block 304. Block 312 further comprises making a decision, on the basis of the comparison, on whether or not the signal strength value prevents or allows the creation of an overlapping TXOP. If the reception signal strength value is lower than the selected reception sensitivity threshold, the wireless device 114 may determine that the overlapping TXOP is allowed and initiate the overlapping TXOP. On the other hand, if the reception signal strength value is higher than the selected reception sensitivity threshold, the wireless device 114 may determine that the overlapping TXOP is not allowed and back off for a time interval, wherein the length of the back-off interval may be determined at least partly on the basis of the time value selected in block 304. In this embodiment where the reception sensitivity threshold is compared with a reception signal strength value, a lower reception sensitivity threshold value results in a higher probability of gaining channel access. In some other embodiments, a higher reception sensitivity threshold value may result in a higher probability of gaining channel access, e.g. when comparing attenuation or path loss of the signal strength between the wireless devices 110, 114 with the reception sensitivity threshold value. The reception sensitivity threshold may be considered to define a sensing range of the wireless device, and any other wireless device carrying out a frame transmission within the sensing range of the wireless device may cause the wireless device to back off. On the other, yet another wireless device outside the sensing range may cause the wireless device to access the channel. The reception sensitivity threshold may thus be understood to define the sensing range in such manner that a larger sensing range decreases the probability of the channel access while a smaller sensing range increases the probability of the channel access. Further with respect to the probability of gaining the channel access, let us consider a first reception sensitivity threshold value and a second reception sensitivity threshold value having a different value than the first reception sensitivity value. Let us further consider that there is a parameter measured and used as a metric for determining whether or not the channel is busy, wherein the parameter is compared with the reception sensitivity threshold currently used. If there is at least one value of the parameter that causes the decision that the channel is busy when compared with the first reception sensitivity threshold value and causes the decision that the channel is not busy when compared with the second reception sensitivity threshold value, the second reception sensitivity threshold value is then considered to provide a higher probability of gaining the channel access.

In an embodiment, the time value is a value determining parameters of a contention window. In the IEEE 802.11 networks, after the wireless device has backed off, it may start the next channel sensing during the next contention window, wherein a time interval of the contention window may be defined by a minimum contention window time $CW_{min}$ and a maximum contention window time $CW_{max}$. The actual back-off time may be selected randomly or arbitrarily within the contention window. The wireless devices 110, 112, 114 may store default values $aCW_{min}$, $aCW_{max}$ for the contention window, and the default values may be adjusted in block 206 according to the above-described mapping. The default values may be the values conventionally used in the IEEE 802.11 networks, for example. As described above in connection with FIG. 3, the access class may further affect the time value, e.g. the contention window may be longer for a lower access class (e.g. AC_BK and AC_BE) and shorter for a higher access class (e.g. AC_VO and AC_VI). Table 1 below shows an example of modifying the default parameters of the contention window and selecting the parameters $CW_{min}$, $CW_{max}$ of the contention on the basis of the access class and the reception sensitivity threshold. In this embodiment, two reception sensitivity thresholds HIGH and LOW have been used, wherein a reception sensitivity threshold HIGH provides the higher probability of gaining the channel access during the channel sensing than the reception sensitivity threshold LOW.

TABLE 1

| AC | Reception Sensitivity Threshold | $CW_{min}$ | $CW_{max}$ |
|---|---|---|---|
| BK | LOW | $(aCW_{min} + 1)/2 - 1$ | $(aCW_{max} + 1)/2 - 1$ |
| BK | HIGH | $aCW_{min}$ | $aCW_{max}$ |
| BE | LOW | $(aCW_{min} + 1)/2 - 1$ | $(aCW_{max} + 1)/2 - 1$ |
| BE | HIGH | $aCW_{min}$ | $aCW_{max}$ |
| VI | LOW | $(aCW_{min} + 1)/4 - 1$ | $(aCW_{min} + 1)/4 - 1$ |

TABLE 1-continued

| AC | Reception Sensitivity Threshold | $CW_{min}$ | $CW_{max}$ |
|---|---|---|---|
| VI | HIGH | $aCW_{min}$ | $(aCW_{min} + 1)/2 - 1$ |
| VO | LOW | $(aCW_{min} + 1)/8 - 1$ | $(aCW_{min} + 1)/8 - 1$ |
| VO | HIGH | $aCW_{min}$ | $(aCW_{min} + 1)/4 - 1$ |

Table 1 shows the time values as the function of the AC and as the function of the reception sensitivity threshold. In other embodiments using only one of the reception sensitivity threshold and the AC, a corresponding table may be derived from Table 1 in a straightforward manner. The actual values of the $CW_{min}$, $CW_{max}$ in Table 1 are merely exemplary and the time values may be calculated according to a different function. The function may output the time values, e.g. $CW_{min}$, $CW_{max}$, as a function of the reception sensitivity threshold and/or the AC such that a lower time value will be for a lower reception sensitivity threshold and for a higher access class. The order of access classes from the lowest to the highest may be defined as BK, BE, VI, VO such that the BK is the lowest AC and the VO is the highest AC. Actual time values output by the function may depend on the design.

Figure 4:
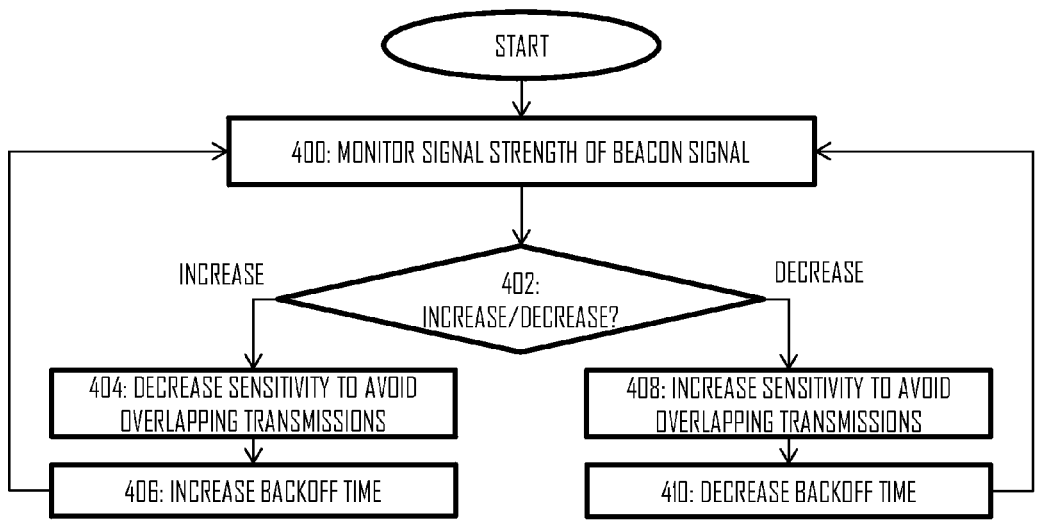
FIGS. 4 to 6 illustrate embodiments for changing the channel sensing parameters according to some embodiments of the invention.

FIG. 4 illustrates a flow diagram of a process for changing the reception sensitivity threshold and the time value on the basis of the reception signal strength of the beacon signal received from the access node 100. Referring to FIG. 4, the wireless device monitors the signal strength of the beacon signals received from the access node in block 400. In block 402, it is determined whether the reception signal strength of the received beacon signal has increased or decreased such that the reception sensitivity threshold and the time value shall be changed. If a significant change is not observed, the process may return to block 400. However, if an increase causing the change of the channel sensing parameters is observed in block 402, the process may proceed to blocks 404 and 406 where the wireless device decreases the sensitivity to avoid the overlapping transmissions (block 404) by changing the reception sensitivity threshold and, furthermore, increases the back-off time or an average back-off time (block 406) by changing the time value. Decreasing the sensitivity to avoid overlapping transmission may be understood such that the wireless device less probably determines to back off upon detecting an overlapping transmission. This may comprise increasing the above-described CCA threshold. Thereafter, the process may return to block 400. On the other hand, if a decrease causing the change of the channel sensing parameters is observed in block 402, the process may proceed to blocks 408 and 410 where the wireless device increases the sensitivity to avoid the overlapping transmissions (block 408) by changing the reception sensitivity threshold and, furthermore, decreases the back-off time or the average back-off time (block 410) by changing the time value. Increasing the sensitivity to avoid overlapping transmission may be understood such that the wireless device more probably determines to back off upon detecting an overlapping transmission. This may comprise decreasing the above-described CCA threshold. Thereafter, the process may return to block 400.

In an embodiment, duration of the TXOP may be mapped to the reception sensitivity threshold and the time value. In the embodiments where the higher channel access probability is gained close to the access node, e.g. by selecting the reception sensitivity threshold providing the higher channel access probability when the reception signal strength of the received beacon signal is high, it may be assumed that the channel conditions between the terminal device and the access node are good. As a consequence, a high data rate modulation and coding scheme may be used. This means that the same amount of data may be transferred in a shorter time interval than with a low data rate modulation and coding scheme and, as a result, a shorter TXOP may be employed. In an embodiment, a TXOP duration value mapped to a reception sensitivity threshold providing the higher channel access probability is shorter than a TXOP duration value mapped to a reception sensitivity threshold providing the lower channel access probability. Table 2 provides an example of such a mapping table and corresponding TXOP durations (TXOP Limit) in milliseconds (ms) for each access class and the reception sensitivity threshold shown in Table 1 above. The TXOP limits according to different IEEE 802.11 specifications have also been described.

TABLE 2

| AC | Reception Sensitivity Threshold | TXOP Limit (ISM band, high rate) | TXOP Limit 802.11ac | TXOP Limit 802.11af |
|---|---|---|---|---|
| BK | LOW | 3.264 ms | 2.080 ms | 0 |
| BK | HIGH | 1.635 ms | 1.040 ms | 0 |
| BE | LOW | 3.264 ms | 2.080 ms | 0 |
| BE | HIGH | 1.635 ms | 1.040 ms | 0 |
| VI | LOW | 6.016 ms | 4.096 ms | 22.56 ms |
| VI | HIGH | 3.008 ms | 2.048 ms | 11.28 ms |
| VO | LOW | 3.264 ms | 2.080 ms | 11.28 ms |
| VO | HIGH | 1.635 ms | 1.040 ms | 5.64 ms |

It should be noted that the values of Table 2 are merely exemplary, and the TXOP duration values may be calculated according to a different function. The function may output the TXOP duration values as a function of the reception sensitivity threshold and/or the AC. The function may output a shorter TXOP duration value for a higher reception sensitivity threshold and a shorter TXOP duration for one AC than for another AC. In the embodiment of Table 2, the AC_VI is allocated with a longer TXOP duration than the other ACs. A principle may be that an AC requiring the highest data rates is assigned with a longer TXOP duration.

Figure 5:
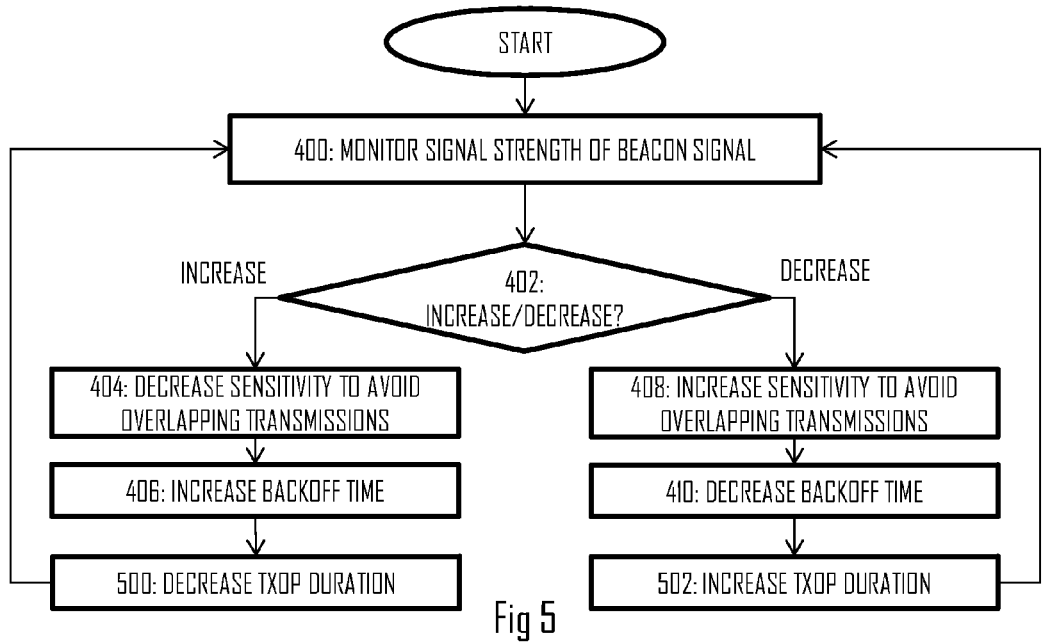

FIG. 5 illustrates a modification of the flow diagram of FIG. 4 with the incorporation of the adaptive TXOP duration. The same reference numbers in FIG. 5 refer to the same or substantially similar operations as in FIG. 4. Referring to FIG. 5, if an increase causing the change of the channel sensing parameters is observed in block 402, the process may proceed to blocks 404, 406, and 500. In block 500, the TXOP duration is decreased. Thereafter, the process may return to block 400. If a decrease causing the change of the channel sensing parameters is observed in block 402, the process may proceed to blocks 408, 410, and 502. In block 502, the TXOP duration is increased. Thereafter, the process may return to block 400.

Figure 6:
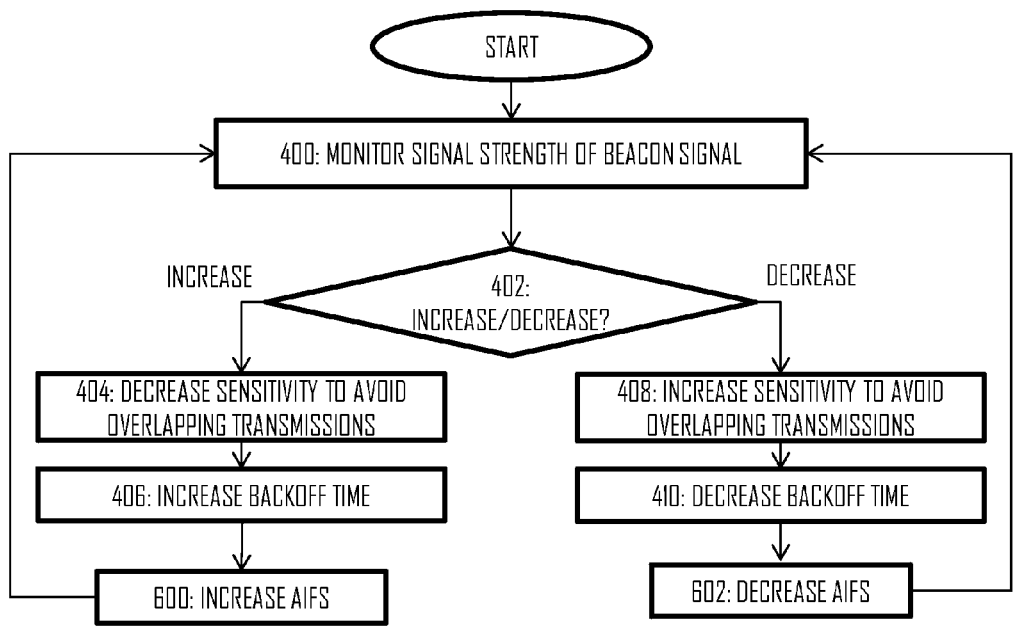

In an embodiment, duration of a guard time interval associated with a frame transmission is mapped to the reception sensitivity threshold and the time value. After the channel is sensed not to contain energy exceeding the reception sensitivity threshold, the wireless device may be configured to wait for the duration of the guard time interval before it may start decrementing the back-off time, as described above. Such a duration parameter may define the length of an arbitration inter-frame spacing (AIFS) of IEEE 802.11 specification. The guard time interval such as the AIFS may be used to ensure that the channel is idle before carrying out a frame transmission. In this embodiment, when the wireless device employs the reception sensitivity threshold providing the higher probability of gaining the channel access, the wireless device may employ a longer guard time interval. Similarly, when the wireless device employs the reception sensitivity threshold providing the lower probability of gaining the channel access, the wireless device may employ a shorter guard time interval. In this manner, the lower probability of gaining the channel access is compensated by providing a shorter back-off time for the wireless device. FIG. 6 illustrates this embodiment which is a modification of the embodiment of FIG. 4. This embodiment is equally applicable to the embodiment of FIG. 5 in a straightforward manner. The same reference numbers in FIG. 6 refer to the same or substantially similar operations as in FIG. 4 and in FIG. 5. Referring to FIG. 6, if an increase causing the change of the channel sensing parameters is observed in block 402, the process may proceed to blocks 404, 406, and 600. In block 600, the length of the guard-time interval, in terms of the number of access slots, such as the AIFS is increased. The guard-time interval may also be considered as a sensing interval in the sense that a wireless device starting to listen to the channel before transmitting a frame must determine that the channel is free at least for the duration of the guard-time interval before it can transmit the frame. Thereafter, the process may return to block 400. If a decrease causing the change of the channel sensing parameters is observed in block 402, the process may proceed to blocks 408, 410, and 602. In block 602, the length of the guard time interval decreased. Thereafter, the process may return to block 400. Blocks 600 and 602 may be incorporated in respective blocks 406 and 410 because the change of the guard time interval causes a similar change to the back-off time. Table 3 below shows examples of the lengths of the guard time intervals as the function of the reception sensitivity threshold and the AC.

TABLE 3

| AC | Reception Sensitivity Threshold | Guard Time Interval |
| --- | --- | --- |
| BK | LOW | 5 |
| BK | HIGH | 7 |
| BE | LOW | 2 |
| BE | HIGH | 3 |
| VI | LOW | 1 |
| VI | HIGH | 2 |
| VO | LOW | 1 |
| VO | HIGH | 2 |

It should be noted that the values of Table 3 are merely exemplary, and the guard time interval values may be calculated according to a different function. The function may output the guard time interval values as a function of the reception sensitivity threshold and/or the AC. The function may output a shorter guard time interval value for a lower reception sensitivity threshold and a shorter guard time interval value for a higher AC. See above description for the ordering of the ACs.

Figure 7:
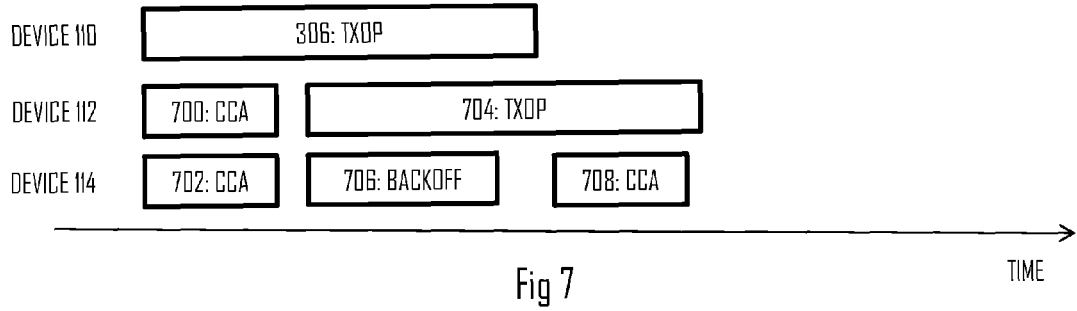
FIGS. 7 and 8 illustrate the effect of different channel sensing parameters.
Figure 8:
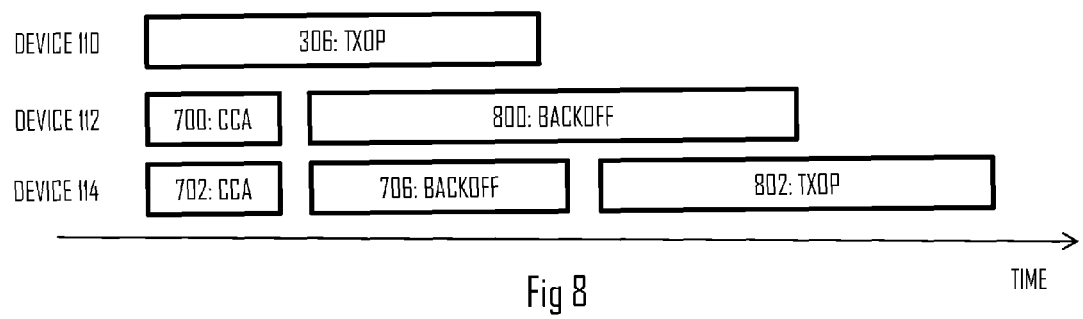

FIGS. 7 and 8 illustrate the effects of the mapped combination of the reception sensitivity threshold and the time value according to an embodiment. Let us assume that the wireless devices 112, 114 employ different reception sensitivity thresholds and, as a consequence, different time values affecting the back-off time. Let us further assume that the wireless device 112 employs the shorter sensing range and, thus, has a higher probability of gaining the channel access and lower sensitivity to avoid overlapping transmissions. On the other hand, the wireless device has a longer back-off time. Referring to FIG. 7, let us assume that the wireless device 110 is carrying out a TXOP 306 and the devices 112, 114 detect a frame transmission of the TXOP during their channel sensing procedures 700, 702. We may further assume for the sake of clarity of the description that the devices 112, 114 are so close to each other that they detect the TXOP 306 with the same reception signal strength. In this example, the detection of the TXOP 306 causes the device 114 to back off 706 because of the higher sensitivity to back-off. Because of the lower sensitivity to back-off, the device 112 considers the TXOP 306 not to cause the back off and, as a result, the device 112 initiates a TXOP 704 by carrying out a frame transmission. The device 112 may also disregard any NAV associated with the TXOP 306 because the TXOP 306 is not considered as affecting the channel access. The device 114 back off at least for the duration of the NAV of the TXOP 306 and start the channel contention 708 after the TXOP 306.

Referring to FIG. 8, let us now assume that the TXOP 306 causes both devices 112, 114 to back off 706, 800. Let us assume that both devices initialize a back-off counter at the time of detecting the TXOP 306. The back-off counter generated may on the average be longer for the device 112 than for the device 114 and, as a result, the device 114 may have a reduced back-off counter and/or a reduced guard time providing more time to decrement the back-off counter, as described above. As a consequence, the device 114 may gain the channel access and chance for the TXOP 802 while the device 112 is decrementing the back-off counter. An assumption is that there is no frame transmission causing the situation of FIG. 7 while the device 114 has finished decrementing the back-off counter and the device 112 is still decrementing the back-off counter.

Figure 9:
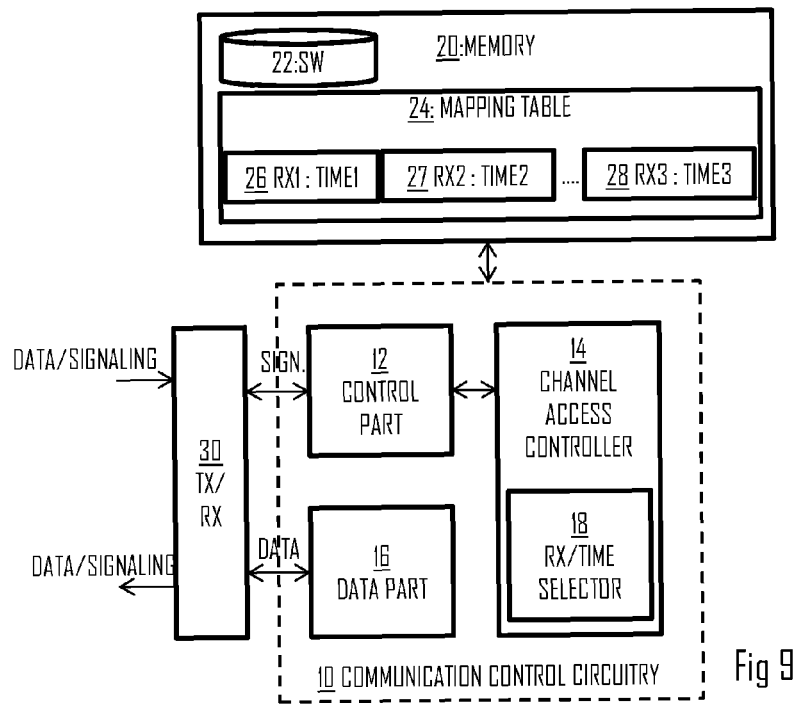
FIG. 9 illustrates a block diagram of a structure of an apparatus according to an embodiment of the invention.

FIG. 9 illustrates an embodiment of an apparatus comprising means for carrying out the above-mentioned functionalities of the wireless device, e.g. a terminal device, user equipment, a client device, or the access node. The wireless device may comply with specifications of an IEEE 802.11 network and/or another wireless network. The wireless device may also be a cognitive radio apparatus capable of adapting its operation to a changing radio environment, e.g. to changes in parameters of another system on the same frequency band. The wireless device may be or may be comprised in a computer (PC), a laptop, a tablet computer, a cellular phone, a palm computer, or any other apparatus provided with radio communication capability. In another embodiment, the apparatus carrying out the above-described functionalities of the wireless device is comprised in such a wireless device, e.g. the apparatus may comprise a circuitry, e.g. a chip, a chipset, a processor, a micro controller, or a combination of such circuitries in the wireless device.

Referring to FIG. 9, the apparatus may comprise a communication controller circuitry 10 configured to control wireless communications in the wireless device. The communication controller circuitry 10 may configure the establishment, operation, and termination of connections or associations in the apparatus, as described above. The communication controller circuitry 10 may comprise a control part 12 handling control signalling communication with respect to transmission, reception, and extraction of control or management frames including beacon messages, request messages, response messages, scanning or probing messages, RTS messages, and clear-to-send (CTS) messages. The control part 12 may also carry out processing of headers of data frames. The communication controller circuitry 10 may further comprise a data part 16 that handles transmission and reception of payload data when the apparatus is associated to one or more other wireless devices.

The communication control circuitry 10 may further comprise a channel access controller 14 configured to determine transmission opportunities of the wireless device. The channel access controller 14 may employ the above-described channel sensing procedure in which the channel is sensed for conflicting frame transmissions that prevent the channel access of the wireless device. The channel access controller 14 may comprise a selector circuitry 18 for selecting the reception sensitivity threshold and associated one or more time values. The control part 12 may be configured to monitor for beacon signals from a wireless device associated to the apparatus and measure the reception signal strength of the received beacon signals. The control part 12 may then output a reception signal strength value to the selector circuitry 18, and the selector circuitry may refer to a mapping table 24 stored in a memory 20 for the reception signal strength value. Upon discovering the reception signal strength value in a record of the mapping table 24, the selector 18 may retrieve the time value(s) and the reception sensitivity threshold mapped to the reception signal strength value in the mapping table 24. The selector circuitry 18 may then output the time value(s) and the reception sensitivity threshold to the channel access controller 14. The channel access controller may then use the received time value(s) and the reception sensitivity threshold in the channel sensing in the above-described manner. In an embodiment where the TXOP duration is dependent on the selected channel sensing parameters, the selector circuitry 18 may retrieve a TXOP duration value mapped to the selected time value(s) and the reception sensitivity threshold in the mapping table 24 and output the TXOP duration value to the control part 12 for use when the channel access controller 14 instructs the control part to initiate the TXOP as a result of detecting the channel to be available.

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise the memory 20 that stores computer programs (software) 22 configuring the apparatus to perform the above-described functionalities of the wireless device. The memory 20 may also store communication parameters and other information needed for the wireless communications. The memory 20 may store the mapping table 24 storing at least the mappings between the time value(s) and the reception sensitivity threshold. The mapping table may store a plurality of mapping records 26, 27, 28 wherein each record defines a different mapping between the time value(s) and the reception sensitivity threshold. The apparatus may further comprise radio interface components 30 providing the apparatus with radio communication capabilities within one or more wireless networks. The radio interface components 30 may comprise standard well-known components such as an amplifier, filter, frequency-converter, (de)modulator, and encoder/decoder circuitries and one or more antennas. The apparatus may in some embodiments further comprise a user interface enabling interaction with the user of the communication device. The user interface may comprise a display, a keypad or a keyboard, a loudspeaker, etc.

In an embodiment, the apparatus carrying out the embodiments of the invention in the wireless device comprises at least one processor 10 and at least one memory 20 including a computer program code 22, wherein the at least one memory and the computer program code are configured, with the at least one processor, to cause the apparatus to carry out the functionalities of the wireless device according to any one of the embodiments of FIGS. 2 to 8. According to an aspect, when the at least one processor 10 executes the computer program code, the computer program code causes the apparatus to carry out the functionalities of the wireless device according to any one of the embodiments of FIGS. 2 to 8. According to another embodiment, the apparatus carrying out the embodiments of the invention in the wireless device comprises the at least one processor 10 and at least one memory 20 including a computer program code 22, wherein the at least one processor 10 and the computer program code 22 perform the at least some of the functionalities of the wireless device according to any one of the embodiments of FIGS. 2 to 8. Accordingly, the at least one processor, the memory, and the computer program code form processing means for carrying out embodiments of the present invention in the wireless device. According to yet another embodiment, the apparatus carrying out the embodiments of the invention in the wireless device comprises a circuitry including at least one processor 10 and at least one memory 20 including computer program code 22. When activated, the circuitry causes the apparatus to perform the at least some of the functionalities of the wireless device according to any one of the embodiments of FIGS. 2 to 8.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 6 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

What is claimed is:

1. A method comprising:
   providing, in an apparatus, mapping between reception sensitivity thresholds for determining whether a radio channel is busy or available for channel access and time values affecting a back-off time representing a time interval the apparatus refrains from channel access upon determining that the radio channel is busy, wherein a first time value is mapped to a first reception sensitivity threshold and a second time value is mapped to a second reception sensitivity threshold such that when the first reception sensitivity threshold provides a higher probability, than the second reception sensitivity threshold, of a determination that the channel is busy, the first time value provides the apparatus with a lower back-off time than the second time value; and
   selecting, by the apparatus, a combination of a reception sensitivity threshold and a time value mapped to each other.

2. The method of claim 1, wherein the reception sensitivity thresholds and the time values are further mapped to signal strength values of a received beacon signal.

3. The method of claim 2, wherein the first reception sensitivity threshold is linked to a first signal strength range of the received beacon signal and the second reception sensitivity threshold is linked to a second signal strength range of the received beacon signal such that when the first signal strength range is below the second signal strength range, the first reception sensitivity threshold provides the higher probability of the determination that the channel is busy.

4. The method of claim 2, wherein a reception signal strength of a detected signal that exceeds the selected reception sensitivity threshold causes the apparatus to determine that the channel is busy, and further comprising increasing the selected sensitivity threshold upon detecting an increase in the signal strength of the received beacon signal.

5. The method of claim 1, wherein each of the first time value and the second time value comprises at least one of a minimum contention window value and a maximum contention window value.

6. The method of claim 1, wherein each of the first time value and the second time value comprises an inter-frame spacing value.

7. The method of claim 1, wherein the first time value is determined as a function of the first reception sensitivity threshold and the second time value is determined as a function of the second reception sensitivity threshold.

8. The method of claim 1, wherein said one of the first time value and the second time value is selected on the basis of the selected reception sensitivity threshold and a currently-applied quality-of-service class.

9. The method of claim 1, wherein the first time value is further linked to a first length of a transmission opportunity and the second time value is further linked to a second length of the transmission opportunity, wherein the first length of the transmission opportunity is higher than the second length of the transmission opportunity.

10. The method of claim 1, wherein the reception sensitivity thresholds and the time values are a function of a location of the apparatus with respect to an access node.

11. An apparatus comprising:
    at least one processor; and
    at least one memory including a computer program code, wherein the at least one memory and the computer program code are configured, with the at least one processor, to cause the apparatus to:
      provide a mapping between reception sensitivity thresholds for determining whether a radio channel is busy or available for channel access and time values affecting a back-off time representing a time interval the apparatus refrains from channel access upon determining that the radio channel is busy, wherein a first time value is mapped to a first reception sensitivity threshold and a second time value is mapped to a second reception sensitivity threshold such that when the first reception sensitivity threshold provides a higher probability, than the second reception sensitivity threshold, of a determination that the channel is busy, the first time value provides the apparatus with a lower back-off time than the second time value; and
      select a combination of a reception sensitivity threshold and a time value mapped to each other.

12. The apparatus of claim 11, wherein the reception sensitivity thresholds and the time values are further mapped to signal strength values of a received beacon signal.

13. The apparatus of claim 12, wherein the first reception sensitivity threshold is linked to a first signal strength range of the received beacon signal and the second reception sensitivity threshold is linked to a second signal strength range of the received beacon signal such that when the first signal strength range is below the second signal strength range, the first reception sensitivity threshold provides the higher probability of the determination that the channel is busy.

14. The apparatus of claim 12, wherein a reception signal strength of a detected signal that exceeds the selected reception sensitivity threshold causes the apparatus to determine that the channel is busy, and wherein the at least one memory and the computer program code are configured, with the at least one processor, to cause the apparatus to increase the selected reception sensitivity upon detecting an increase in the signal strength of the received beacon signal.

15. The apparatus of claim 11, wherein each of the first time value and the second time value comprises at least one of a minimum contention window value and a maximum contention window value.

16. The apparatus of claim 11, wherein each of the first time value and the second time value comprises an inter-frame spacing value.

17. The apparatus of claim 11, wherein the at least one memory and the computer program code are configured, with the at least one processor, to cause the apparatus to determine the first time value as a function of the first reception sensitivity threshold and to determine the second time value as a function of the second reception sensitivity threshold.

18. The apparatus of claim 11, wherein the at least one memory and the computer program code are configured, with the at least one processor, to cause the apparatus to select said one of the first time value and the second time value on the basis of the selected reception sensitivity threshold and a currently-applied quality-of-service class.

19. The apparatus of claim 11, wherein the first time value is further linked to a first length of a transmission opportunity and the second time value is further linked to a second length of the transmission opportunity, wherein the first length of the transmission opportunity is higher than the second length of the transmission opportunity.

20. The apparatus of claim 11, wherein the reception sensitivity thresholds and the time values are a function of a location of the apparatus with respect to an access node.

21. The apparatus of claim 11, further comprising radio interface components providing the apparatus with radio communication capability.

22. A computer program product embodied on a non-transitory computer-readable medium and comprising program instructions which, when loaded into an apparatus, execute a computer process comprising:

providing mapping between reception sensitivity thresholds for determining whether a radio channel is busy or available for channel access and time values affecting a back-off time representing a time interval the apparatus refrains from channel access upon determining that the radio channel is busy, wherein a first time value is mapped to a first reception sensitivity threshold and a second time value is mapped to a second reception sensitivity threshold such that when the first reception sensitivity threshold provides a higher probability, than the second reception sensitivity threshold, of a determination that the channel is busy, the first time value provides the apparatus with a lower back-off time than the second time value; and selecting a combination of a reception sensitivity threshold and a time value mapped to each other.

* * * * *